(12) United States Patent
Schultheis

(10) Patent No.: US 12,138,829 B2
(45) Date of Patent: Nov. 12, 2024

(54) HEAVY LOAD VORTEX INTERNAL APPARATUS FOR HANDLING PLASTIC GRANULAR MATERIAL AND METHOD RELATED THERETO

(71) Applicant: Vibra Maschinenfabrik Schultheis GmbH & Co., Offenbach (DE)

(72) Inventor: Winfried Schultheis, Offenbach (DE)

(73) Assignee: Vibra Maschinenfabrik Schultheis GmbH & Co., Offenbach (DE)

( * ) Notice: Subject to any disclaimer, the term of this patent is extended or adjusted under 35 U.S.C. 154(b) by 148 days.

(21) Appl. No.: 18/089,111

(22) Filed: Dec. 27, 2022

(65) Prior Publication Data

US 2023/0140437 A1 May 4, 2023

Related U.S. Application Data

(63) Continuation of application No. PCT/EP2020/068176, filed on Jun. 28, 2020.

(51) Int. Cl.
*B29B 9/16* (2006.01)
*B65G 27/32* (2006.01)

(52) U.S. Cl.
CPC .............. *B29B 9/16* (2013.01); *B65G 27/32* (2013.01); *B29B 2009/165* (2013.01)

(58) Field of Classification Search
CPC ...... B29B 9/16; B29B 2009/165; B65G 27/32
See application file for complete search history.

(56) References Cited

U.S. PATENT DOCUMENTS

| 5,628,947 A | 5/1997 | Keilert |
| 2007/0276119 A1 | 11/2007 | DeBruin et al. |
| 2008/0171847 A1 | 7/2008 | Weyell et al. |

FOREIGN PATENT DOCUMENTS

| CN | 203794103 U | 8/2014 |
| DE | 10 2004 042 612 A1 | 3/2006 |
| DE | 10 2015 203 654 A1 | 9/2016 |
| EP | 1 924 414 B1 | 1/2012 |
| KR | 100725291 B1 | 6/2007 |

OTHER PUBLICATIONS

International Search Report issued for International Patent Application No. PCT/EP2020/068176, dated Feb. 23, 2021.

*Primary Examiner* — James Sanders
(74) *Attorney, Agent, or Firm* — Myers Wolin, LLC

(57) ABSTRACT

A heavy load vortex internal apparatus is provided having a vibration channel for receiving plastic granular material. The vibration channel has a channel floor and two side walls opposite each other, where the length of the vibration channel is greater in the longitudinal direction than the maximum height and width of a channel cross section perpendicular to the longitudinal direction. At least two vibration generators are provided for generating a vibration excitation having a transverse component perpendicular to a vertical plane in the longitudinal direction. At least two channel carriers are spaced apart from each other in the longitudinal direction, each supporting the channel floor and the side walls from the outside and bridging the vibration channel opposite the channel floor. One of the vibration generators in each case is fastened to at least two of the channel carriers. Also provided is a method for crystallization of plastic granular material.

19 Claims, 3 Drawing Sheets

HEAVY LOAD VORTEX INTERNAL APPARATUS FOR HANDLING PLASTIC GRANULAR MATERIAL AND METHOD RELATED THERETO

CROSS REFERENCE TO RELATED APPLICATIONS

This application is a continuation under 35 U.S.C. § 120 of International Application PCT/EP2020/068176, filed Jun. 28, 2020, the contents of which are incorporated by reference herein.

FIELD OF THE INVENTION

The invention relates to a swirling trough device for treating plastic granules.

BACKGROUND

Certain plastic granules are subjected after the actual granulation to an in particular thermal post-treatment in order to change the structure of the granules. For example, polylactide granules (PLA granules) polytetrafluoroethylene granules (PET granules) are first obtained from the granulation process in an amorphous state. The amorphous granules are converted into an at least partially crystalline state in a post-treatment step, also referred to as crystallization. This results in an increased alignment among the molecular chains.

The temperature control plays an important role for the crystallization. On the one hand, the amorphous granules must be brought to a corresponding reaction temperature or held at it. On the other hand, however, some granules, such as PLA granules, PET granules, and PU granules, tend to stick together in a transition phase.

PLA granules usually exit the granulator at a temperature in the range of 80 to 120° C. The individual PLA granule particles initially have a very sticky surface. Due to the glass transition temperature of about 60 to 80° C. and the crystallization temperature of about 90° C., which are very close to each other, drying and crystallizing PLA is made difficult because the granule particles must be prevented from sticking to each other during crystallization.

PET granules, also, are already sticky under the reaction temperature required for the crystallization, which is about 80° C. to 170° C. In order to avoid agglomeration of the granule particles, they must therefore be moved during the crystallization. The tendency to stick together decreases as the degree of crystallization increases.

Many technical solutions for crystallizing such granules are known from the prior art.

More recent approaches are based upon the consideration of subjecting the pre-dried, warm granules from the granulation to a vibration excitation during an immediately downstream crystallization process. The vibration excitation prevents adhesion of the granule particles. At the same time, the process heat stored in the granule particles can be utilized for the crystallization, so that no additional heat is required. In contrast to this, granules which are temporarily stored in a silo, for example, must, in order to prevent the adhesion, first be cooled down, and subsequently heated again for the crystallization.

EP 1 924 414 B1 discloses the post-treatment of the granules in the range of their reaction temperature for the crystallization, using what is known as a swirling trough device. Such a device comprises a vibrating trough for receiving the granules and at least one vibration exciter for vibration excitation of the vibrating trough. The vibration excitation takes place with a distinct transverse component perpendicular to a plane which is spanned by the longitudinal direction of the vibrating trough and the vertical direction.

This special type of vibration excitation causes a helical movement of the granules in the longitudinal direction of the vibrating trough, which is characteristic of swirling trough devices. Due to the vibration excitation in the transverse direction, the granule particles move upwards on the side wall of the vibrating trough and then slide back into the trough, over the subsequently rising granule particles, upon reaching vertical wall portions. This results in an uninterrupted, continuous granule flow with high interaction of the granule particles with one another, such that these can exchange process heat with one another. In this way, not only a very narrow residence time spectrum of the granule particles in the crystallization stage is achieved, but at the same time also a very homogeneous temperature profile, which has an advantageous effect on the product quality. Using conventional vibrating conveyors, screen machines, or screw conveyors, such an effect cannot be achieved, since a helical movement of the granules with high interaction of the granule particles is not possible there.

The swirling trough device proposed in EP 1924414 B1, which can be attributed to the applicant of the present application, is suitable only for relatively small product throughput rates due to the design. Due to the transverse component required for generating the helical movement of the product, high mass forces transverse to the vertical direction and longitudinal direction of the vibrating trough occur as the product quantity increases.

SUMMARY

An object of the present invention is that of achieving higher product throughput rates using a swirling trough device during the crystallization of plastic granules.

Such an object may be achieved by a heavy-duty swirling trough device according to claim 1. Said device comprises a vibrating trough for receiving plastic granules, which has a trough base and two opposite side walls, wherein the length of the vibrating trough in the longitudinal direction is greater than the maximum height and width of a trough cross-section perpendicular to the longitudinal direction; at least two vibration exciters for generating a vibration excitation which has a transverse component perpendicular to a plane formed by the longitudinal direction and the vertical direction; and at least two trough supports, which are spaced apart from one another in the longitudinal direction of the vibrating trough, each support the trough base and the side walls from the outside, and also bridge the vibrating trough on the side opposite the trough base; wherein one vibration exciter is fastened to at least two of the trough supports in each case.

Such a configuration makes it possible for the first time to treat product quantities having a mass of 3 to 10 t without losses in the product quality. In this case, accelerations of 30 to 60 kgm/s$^2$ can be achieved.

Due to the special design of the trough supports, the high mass forces in the transverse direction can be managed well.

Advantageous embodiments of the invention form the subject matter of further claims.

Thus, for a particularly stable design, the trough supports can each form a closed ring which radially surrounds the vibrating trough.

Preferably, the vibrating trough passes substantially perpendicularly through the trough supports, so that the longitudinal direction of the vibrating trough and the main extension plane of the respective trough support enclose a smallest angle in the range from 75° to 88°. The trough supports thus brace the vibrating trough substantially in the plane of its cross-section.

In one variant, the main extension plane of the trough support is a vertical plane which extends substantially transversely to the longitudinal direction of the vibrating trough. Several trough supports can be placed parallel to one another in the longitudinal direction of the vibrating troughs.

In a further variant, the trough support has a one-piece support plate with a constant wall thickness, in which a passage opening for the vibrating trough is formed. Such a plate can be produced with little effort. If necessary, it can additionally be stiffened at its edge by flange plates.

Furthermore, the trough base of the vibrating trough can be inclined downwards in the longitudinal direction from a feed end to an outlet end. This promotes the transport of granules in the longitudinal direction through the vibrating trough. Preferably, the product transport is brought about solely by the new feed at the feed end, but can optionally also be assisted vibrationally. However, the skin vibration excitation component remains aligned in the transverse direction. High accelerations of granule particles in the longitudinal direction are avoided.

In a preferred variant, the trough base of the vibrating trough is inclined in the longitudinal direction at an angle in the range of 2° to 15° to the horizontal plane.

According to a further variant, the trough cross-section between a feed end and an outlet end of the vibrating trough is free of barriers. This promotes the mixing in the product stream and is advantageous for homogeneous product quality.

The trough supports can be included in a cage-like housing structure which, on the one hand, has a high stiffness, but on the other requires a small amount of material and is thus relatively lightweight. For this purpose, according to a further variant, adjacent trough supports are connected to one another by at least three longitudinal members in the longitudinal direction of the vibrating trough.

It has also been shown that the direction of force action of the vibration excitation plays an important role precisely in the case of high product masses in the vibrating trough. Preferably, also with regard to the overall height and support of the device, the vibration exciters, above the vibrating trough, and, there, preferably in a region above or laterally outside next to one of the side walls, are arranged in such a way that the force action line of the vibration excitation of the respective vibration exciter extends at a distance of at most 20%, and preferably at most 10%, of the width of the vibrating trough between the side walls to the upper edge of the side wall on the side of the vibration exciter. The above arrangement of the vibration exciters also enables a simple thermal insulation of the vibrating trough from below.

Preferably, the force action line of the vibration excitation of the respective vibration exciter is aligned and matched to the width of the vibrating trough such that it intersects this upstream of the center of the trough base in the transverse direction of the vibrating trough.

In a further variant, the force action line of the vibration excitation of the vibration excitation of the respective vibration exciter in a vertical plane including the transverse direction preferably encloses an angle in the range of 25° to 50° with the trough base. Angles that are too flat and too steep prevent the desired rise of the granule particles on the side wall and the formation of a pronounced helical movement or a vortex in the vibrating trough.

In order to promote the helical movement of granules in the vibrating trough, the trough base has a straight portion in the plane of the trough cross-section which is inclined downwards away from the vibration exciter to a horizontal in the plane of the trough cross-section, and in particular can be inclined to the horizontal at an angle of 2° to 15°.

In the case of larger trough widths, the straight portion can be divided into two or more straight segments by one or more beads extending in the longitudinal direction of the vibrating trough. In this case, the average total inclination preferably remains in the aforementioned framework of 2° to 15°.

In this connection, it is further advantageous if the side walls of the vibrating trough each merge into the trough base via a curved portion, wherein the radius of curvature of the curved portion on the side of the vibration exciter is greater than the radius of curvature of the curved portion on the opposite side. Due to the reduced radius of curvature on the side facing away from the vibration exciter, the usable capacity of the vibrating trough is also increased.

Preferably, the ratio of the radius of curvature of the curved portion on the side of the vibration exciter to the radius of curvature of the curved portion on the opposite side is greater than 2, and more preferably greater than 5.

Furthermore, the ratio of the radius of curvature of the curved portion on the side of the vibration exciter to the width of the vibrating trough between the side walls should as far as possible be selected so as to be less than 0.3 and greater than 0.1.

As already mentioned, the radius of curvature of the curved portion on the side of the vibration exciter is to be greater, and in particular significantly greater, than the radius of curvature of the curved portion on the opposite side. In a further variant, this larger radius of curvature is selected such that it is at least a quarter of the greatest trough depth of the vibrating trough, i.e., the height of the vibrating trough measured on the inside thereof.

The target filling of the vibrating trough is greater than 50% of the trough cross-section.

The heavy-duty swirling trough device explained above is suitable in particular for carrying out a method for crystallizing plastic granules having a tendency to stick together. Said method includes loading the vibrating trough according to one of the aforementioned claims with plastic granules which, when fed in, have a temperature above the glass transition temperature thereof in the range of the reaction temperature thereof for crystallization, and exciting the vibrating trough by means of the vibration exciter in such a way that the plastic granules in the vibrating trough are subjected to a helical movement, wherein the residence time of the plastic granules in the vibrating trough is 20 to 60 minutes, and the vibrating trough is filled with plastic granules over at least 50% of its cross-section. In this case, the feed of granules is preferably carried out continuously. However, a batch operation is also possible.

BRIEF DESCRIPTION OF THE DRAWING

The invention will be explained in more detail below with reference to an embodiment shown in the drawings, in which.

DETAILED DESCRIPTION OF THE PREFERRED EMBODIMENTS

Figure 1:
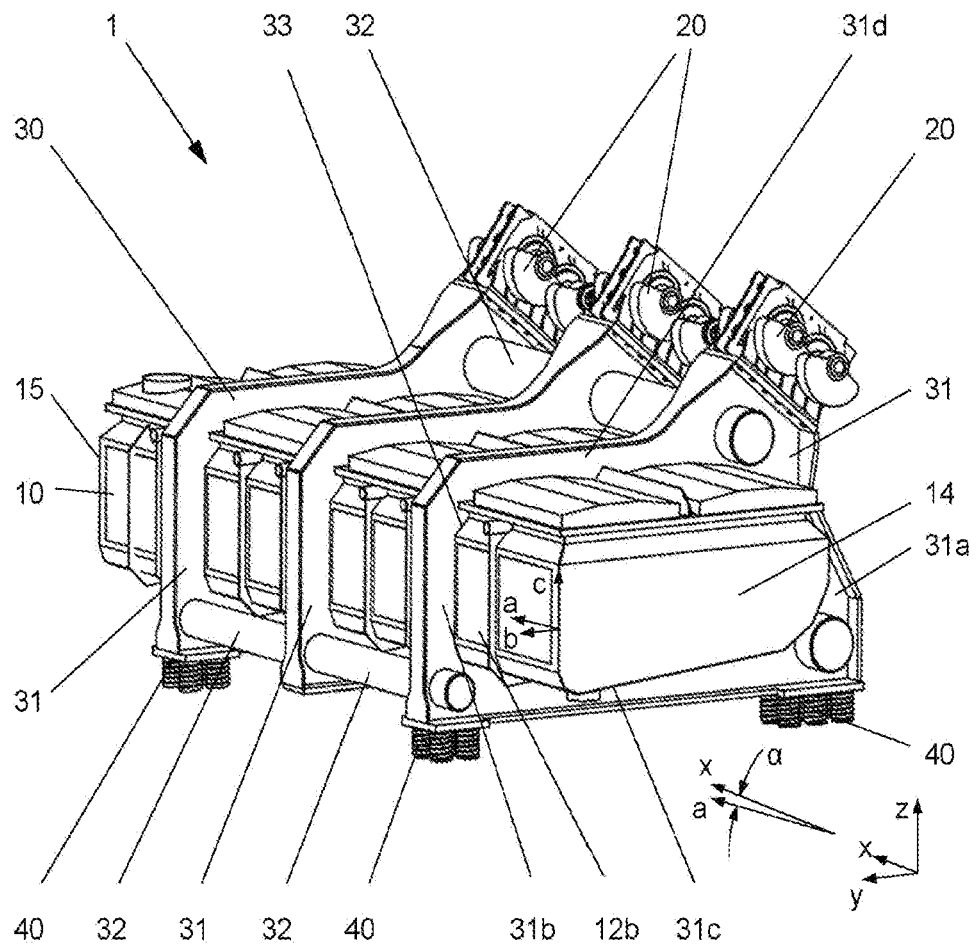
FIG. 1 is a three-dimensional view of a heavy-duty swirling trough device according to one embodiment of the invention.
Figure 2:
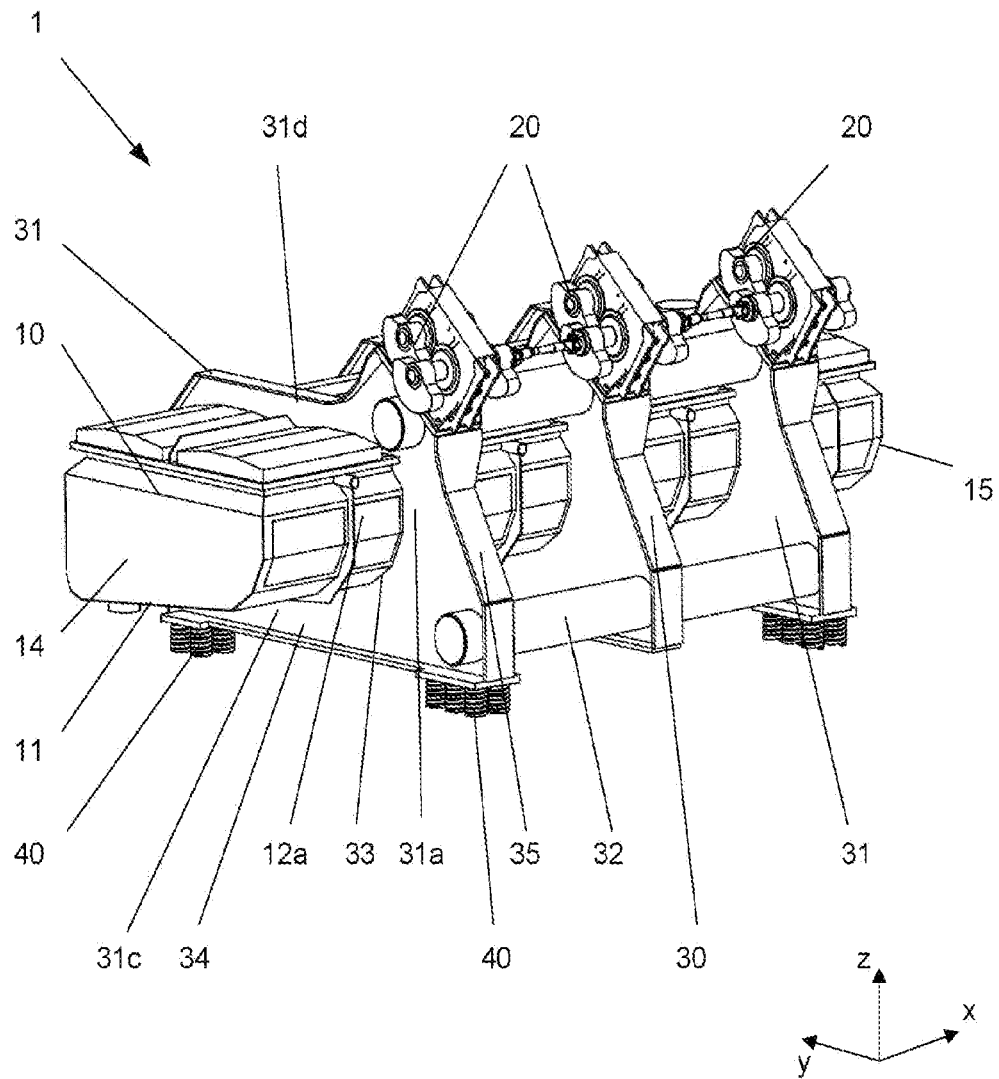
FIG. 2 is a further three-dimensional view of the heavy-duty swirling trough device according to FIG. 1.
Figure 3:
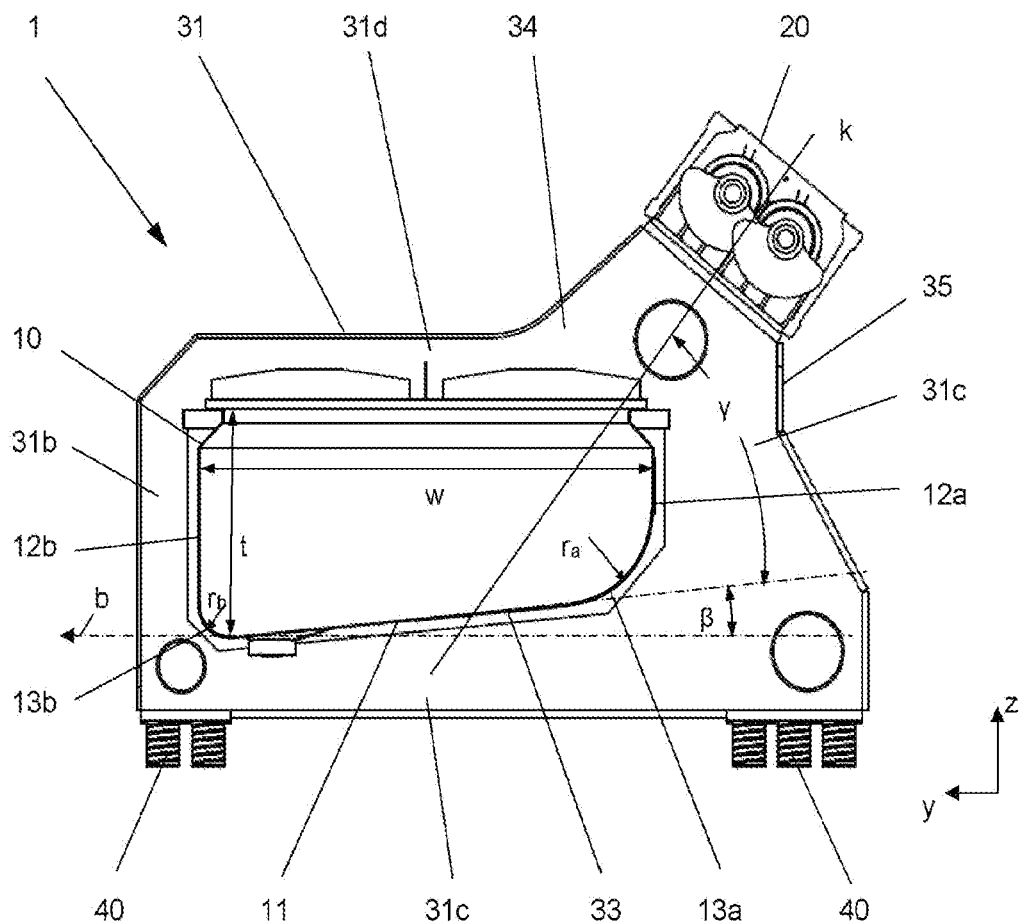
FIG. 3 is a sectional view of the heavy-duty swirling trough device according to FIG. 1.

The embodiment in FIGS. 1 through 3 shows a device which is suitable and configured for crystallizing plastic granules in the form of a heavy-duty swirling trough device 1. The technical principle of a swirling trough, upon which the present invention is based, is explained in EP 1924414 B1, the content of which in this respect is explicitly incorporated into the present disclosure.

In the figures and in the following explanations, reference is made to a Cartesian coordinate system xyz, in which x represents a horizontal axis, y represents a horizontal axis orthogonal to x, and z represents a vertical axis orthogonal to x and y. The vertical axis z coincides with the direction of gravity. Consequently, the x- and y-axes span a horizontal plane xy perpendicular to the direction of gravity.

For the heavy-duty swirling trough device, reference is further made to a further Cartesian location coordinate system abc, in which a defines a longitudinal axis of the device, b defines a transverse direction of the device orthogonal thereto, and c defines a horizontal orthogonal to a and b. The transverse direction b coincides with the y-axis. If reference is made in the following to a transverse direction, this is to be understood as defined above. The longitudinal axis a can coincide with the x-axis, and the vertical direction c with the z-axis. As a rule, the longitudinal axis a and the vertical direction z are, however, slightly inclined towards the corresponding axes x and z, as will be explained in more detail further below.

The heavy-duty swirling trough device 1 initially comprises a vibrating trough 10 for receiving plastic granules. The vibrating trough 10 is designed in the manner of an elongate trough having a substantially U-shaped cross-sectional profile. Accordingly, it has a trough base 11 and two opposite side walls 12a and 12a, which are connected to one another by the trough base 11.

Preferably, the cross-sectional profile is constant over the length of the vibrating trough 10. In addition, this is free of barriers, between its ends, in the longitudinal direction a.

The side walls 12a and 12b can be oriented substantially parallel to one another and have a constant distance from one another in the longitudinal direction, which is preferably in a range of 1,000 to 3,000 mm, and further preferably of 1,500 to 2,500 mm. They extend in the longitudinal and vertical directions a and c of the vibrating trough.

The side walls 12a and 12b each merge into the trough base 11 via a curved portion 13a or 13b.

The trough base 11 can in principle be designed as a substantially planar surface in the horizontal plane xy. However, it is preferably slightly inclined in the longitudinal direction a and/or in the transverse direction b of the vibrating trough 10.

Thus, the trough base 11 of the vibrating trough 10 can be inclined downwards in the longitudinal direction a from a feed end 14 to an outlet end 15 of the vibrating trough 10 in order to promote the passage of granules from the feed end 14 to the outlet end 15. This is the case in particular if the feed of granules in the vibrating trough 10 is to be accomplished solely and exclusively by the feed of granules into the vibrating trough 10, i.e., without conveying vibrational support. In a modification thereof, a feed of granules in the longitudinal direction a can, however, also be generated vibrationally. The latter also includes the possibility of reversing the feed direction of the granules in the vibrating trough 10.

The inclination in the longitudinal direction a preferably takes place at an angle $\alpha$ in the range of 2° to 15° to the horizontal plane xy. In relation to the coordinate systems defined above, this means that the longitudinal axis a is set to the x-axis and the mentioned angle $\alpha$.

The inclination of the trough base 11 in the transverse direction b is indicated in FIG. 3. The trough base 11 has a straight portion in the plane of the trough cross-section, i.e., a plane bc, which is inclined downwards to a horizontal b in the plane bc of the trough cross-section, from the first side wall 12a to the second side wall 12b. The straight portion of the trough base 11 is preferably inclined at an angle $\beta$ of 2° to 15° in particular to the horizontal b. The trough base 11 thus represents an inclined plane in the transverse direction b of the vibrating trough 10.

Figure 4:
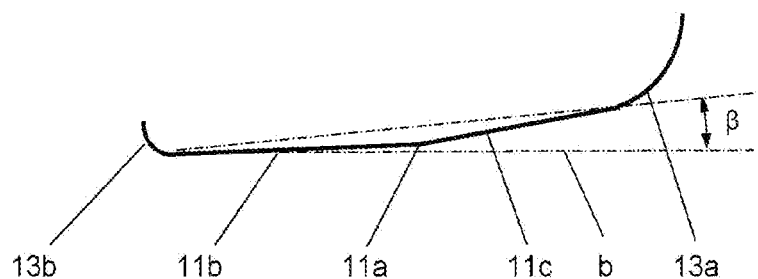
FIG. 4 is a detail view of the trough base of a variant having a beaded straight portion.

In a modification of the embodiment, the straight portion of the trough base 11 is divided by one or more beads 11a, extending in the longitudinal direction a of the vibrating trough 10, into two or more straight segments 11b, 11c, which are angled relative to one another. FIG. 4 shows, by way of example, the cross-section of a beaded trough base 11 having two straight segments 11b and 11c. In this case, the average total inclination $\beta$, which is measured between the merging of the trough base 11 into the curved portions 13a and 13b, preferably remains in the range of 2° to 15°. The beads of the trough base 11 achieve a stiffening effect.

As already mentioned, the side walls 12a and 12b of the vibrating trough 10 each merge into the trough base 11 via a curved portion 13a and 13b. In this case, as also indicated in FIG. 3, the radius of curvature $r_a$ of the curved portion 13a on one side is greater than the radius of curvature $r_b$ of the curved portion 13b on the opposite side. In the region of the curved portion 13a of the first-mentioned side, the vortex formation takes place in the granules. The smaller radius of curvature $r_b$ on the opposite side is advantageous for a large filling volume of the vibrating trough 10, as a result of which a high product throughput can be achieved.

The larger radius of curvature $r_a$ is selected such that it is at least a quarter of the greatest trough depth t of the vibrating trough 10, i.e., the height of the vibrating trough 10 measured on the inside thereof.

The ratio of the radius of curvature $r_a$ of the curved portion 13a on the first-mentioned side to the radius of curvature $r_b$ of the curved portion 13b on the opposite side is greater than 2, and more preferably greater than 5.

Particularly expedient radii of curvature $r_a$ for the curved portion 13a on the first-mentioned side lie in the range of 180 to 450 mm at a trough width of 1,800 mm.

With respect to the clear width w of the vibrating trough 10 between the side walls 12a and 12b, i.e., the extension thereof in the transverse direction b or y, the ratio of the radius of curvature $r_a$ of the curved portion 13a on the first-mentioned side to the width of the vibrating trough 10 is preferably less than 0.25 and/or greater than 0.1.

Usually, the clear width w is selected so as to be greater than the trough depth t.

The device 1 further comprises at least two vibration exciters 20 for generating vibration excitation on the vibrating trough 10, wherein the vibration excitation has a component in the transverse direction b or y. This transverse component of the vibration excitation is decisive, in conjunction with the formation of the cross-sectional profile of the vibrating trough 10, for the formation of a vortex or helical movement of the granules about an axis, parallel to the longitudinal direction a, in the vibrating trough 10. In addition, the vibration excitation can contain a component in the vertical direction z or height direction c. In contrast, the proportion in the longitudinal direction a or in the direction of the x-axis is negligible.

The vibration exciters 20 can be designed, for example, as directed exciters, which are coupled to one another so that the excitation by all vibration exciters 20 takes place synchronously. However, other types of exciters are also possible.

The vibration exciter 20 is not attached directly to the vibrating trough 10, but, rather, to a cage-like housing structure 30, which is explained in more detail below and which carries the vibrating trough 10.

The housing structure 30 is based upon two or more trough supports 31, which are preferably arranged in parallel, i.e., in the longitudinal direction a of the vibrating trough 10, in succession. In this case, the trough supports 31 are each spaced apart from one another, as can be clearly seen in FIGS. 1 and 2. The trough supports 31 can be produced as initially separate components. In the present case, three trough supports 31 are shown by way of example. However, the number thereof can also be selected to be smaller or larger, depending upon the length of the vibrating trough 10.

The housing structure 30 also has longitudinal members 32 by which adjacent trough supports 31 are rigidly connected to one another. In the present case, three longitudinal members 32 are provided, which extend laterally to the vibrating trough 10, and preferably in the x-direction, in order to connect at least two adjacent trough supports 31 or, optionally, also all the trough supports 31. The longitudinal members 32 can be rod-shaped or bar-shaped. In one variant, these have a constant cross-sectional profile. In particular, the longitudinal members 32 can also be designed as hollow profiles.

The housing structure 30 is supported against a substrate via springs 40. The springs 40 are preferably arranged on at least some of the trough supports 31.

The vibration exciters 20 preferably sit above the vibrating trough 10 on the trough supports 31, and preferably above the side wall 12a of the first-mentioned side, or somewhat laterally to the outside thereof.

With regard to the simultaneous processing of large masses of granules on the order of magnitude of 3 to 10 t in the vibrating trough 10, the trough supports 31 are designed in a special manner.

The cross-section of a trough support 31 can be clearly seen in FIG. 3. The trough support 31 is rigidly connected to the vibrating trough 10. In particular, the trough support 31 has two vertical struts 31a and 31b, which extend vertically upwards from a lower base portion 31c. The vertical struts 31a and 31b are connected to one another by a bracket portion 31d, so that a passage opening 33 for the vibrating trough 10 is formed between said portions 31a through 31d. The trough support 31 has its main extension in the direction of the y- and z-axes, i.e., its extension in the x-direction is comparatively small relative thereto, such that it can be referred to as disk-shaped or plate-shaped.

As can be seen in FIGS. 1 through 3, the trough support 31 supports the trough base 11 and the side walls 12a and 12b of the vibrating trough 10 from the outside. Thus, the vertical struts 31a and 31b rest against the side walls 12a and 12b of the vibrating trough, on the outside. Likewise, the trough base 11 rests on the lower base portion 31c.

Furthermore, the trough support 31 bridges the vibrating trough 10 on the side opposite the trough base 11. The bracket portion 31d, which connects the vertical struts 31a and 31b to one another, accordingly extends above the vibrating trough 10 in the transverse direction b or y.

In the present case, the trough supports 31 each form a closed ring, which radially surrounds the vibrating trough 10.

In this case, the vibrating trough 10 passes approximately perpendicularly through the trough supports 31, i.e., the longitudinal direction a of the vibrating trough 10 encloses a smallest angle with the main extension plane xy of the respective trough support 31 in the range of 75° to 90°.

As a result, a very stable mounting of the vibrating trough 10 on the housing structure 30 is achieved, which in turn can be designed so as to be relatively lightweight. In particular, any widening or breathing of the vibrating trough 10 in the transverse direction b is counteracted.

In one variant, the trough supports 31 each have a one-piece support plate 34 with a constant wall thickness, in which the passage opening 33 for the vibrating trough 10 is formed. Additional stiffening can be achieved very easily by flange plates 35 welded to the outer edges of the support plate 34.

Instead of a one-piece support plate 34, the ring structure of a trough support 31 directly supporting the vibrating trough 10 can also be assembled, and in particular welded, from several individual parts.

Furthermore, it is possible to produce a trough support 31 as a casting.

The vibration exciters 20 are arranged on the trough supports 31 above the vibrating trough 10 in a region above or laterally outside next to one of the side walls 12a in such a way that the force action line k of the vibration excitation of the respective vibration exciter 20 extends at a distance of at most 20%, and more preferably at most 10%, of the width w of the vibrating trough 10 between the side walls 12a and 12b to the upper edge 12c of the side wall 12a on the side of the vibration exciter.

The force action line k of the vibration excitation of the respective vibration exciter 20 preferably intersects the trough base 11 upstream of the center of the trough base 11 in the transverse direction b or y of the vibrating trough 10. This promotes the vortex formation in the region of the more gently curved curved portion 13a, on the side of the vibration exciter, of the vibrating trough 10 and ensures a large number of collisions between the granule particles to be treated.

Furthermore, the force action line k of the vibration excitation of the respective vibration exciter 20 in a vertical plane yz that includes the transverse direction b or y encloses an angle γ in the range of 25° to 50° with the trough base 11.

By means of the above heavy-duty swirling trough device 1, granule masses of 3 to 10 t can be treated simultaneously without losses in the product quality, wherein acceleration values in the range from 30 to 60 kgm/s$^2$ are possible, which ensure that the granule particles do not stick together.

In this case, the target filling of the vibrating trough 10 can be greater than 50% of the trough cross-section, i.e., good utilization of the treatment space for the granules is achieved.

Due to the radial encompassing of the trough-shaped vibrating trough 10, the trough supports 31 are particularly suitable for absorbing forces introduced in the direction of the y-axis, transverse to the product flow direction. These forces are very high in the case of a large product filling and can also be additionally amplified in their effect by the dynamic excitation of the product, and in particular clump formation in the product, which cannot be excluded.

Achievable widths of the vibrating trough 10 are approximately 1,000 to 3,000 mm. In this case, construction lengths of 5,000 to 10,000 mm are possible.

This takes account of the fact that, in the case of certain plastics, increasingly higher performance, i.e., product volumes at an approximately constant residence time, is desired, but the number of vibrating troughs to be used in series is to remain limited, as far as possible, to a maximum of three swirling trough devices, for reasons of installation and cost.

The design of the housing structure 30 carrying the vibrating trough 10, consisting of several, preferably disk-shaped, trough supports 31, each of which radially encompasses the trough-shaped vibrating trough 10 and at the same time absorbs the forces introduced by the vibration exciter 20, remains comparatively lightweight and expedient to produce, despite the ability to support the high transverse forces.

The heavy-duty swirling trough device 1 explained above is suitable in particular for carrying out a method for crystallizing plastic granules having a tendency to stick together, such as PLA, PET, or PU. For this purpose, the vibrating trough 10 of the heavy-duty swirling trough device 1 is loaded with plastic granules which have already been heated when fed in, i.e., in particular have a temperature above the glass transition temperature thereof in the range of the reaction temperature thereof for crystallization.

In particular, the raw granules can be directly taken over from a granulating device, with a view to saving energy, without said granules having to be cooled beforehand. However, this means that, in the case of limited space conditions, sufficient space must be present for the subsequent swirling trough or swirling troughs, which is why a compact design which enables large throughputs is of great importance.

The vibrating trough 10 is excited by means of the vibration exciter 20, which is, spatially, advantageously attached to the trough supports 31, in such a way that the plastic granules are subjected to a helical or vortex-like movement in the vibrating trough 10, so that good mixing of the granules results. This in turn results in the temperature profile for all granule particles remaining very uniform, i.e., all granule particles are treated as far as possible under the same conditions, so that a very homogeneous product quality is established.

The residence time of the plastic granules in the vibrating trough 10 under vibration excitation is usually 20 to 60 min when the vibrating trough is filled with approximately 50% of its cross-section or more. At the end of the residence time, the crystallization has progressed to such an extent that the granule particles are no longer sticky, such that they are either completely filled or can be crystallized in further devices to higher degrees of crystallization.

The invention has been explained in detail above with reference to one possible embodiment and further modifications. The embodiment and the modifications serve to prove the feasibility of the invention. Technical individual features which were explained above in the context of further individual features can also be implemented independently of said further individual features and in combination with other individual features, even if this is not expressly described, as long as this is technically possible. The invention is therefore expressly not limited to the embodiment specifically described, but includes all embodiments defined by the claims.

What is claimed is:

1. A heavy-duty swirling trough device (1), comprising:
   a vibrating trough (10) for receiving plastic granules, which vibrating trough has a trough base (11) and two opposite side walls (12a, 12b), the length of the vibrating trough (10) in the longitudinal direction (a) being greater than the maximum height and width of a trough cross section perpendicular to the longitudinal direction;
   at least two vibration exciters (20) for generating a vibration excitation which has a transverse component (y) perpendicular to a plane formed by the longitudinal direction (a) and vertical direction (z); and
   at least two trough supports (31), which are spaced apart from one another in the longitudinal direction (a) of the vibrating trough (10), each support the trough base (11) and the side walls (12a, 12b) from the outside, and also bridge the vibrating trough (10) on the side opposite the trough base (11),
   one of the vibration exciters (20) being fastened to at least two of the trough supports (31) in each case.

2. The heavy-duty swirling trough device (1) of claim 1, wherein the trough supports (31) each form a closed ring which radially surrounds the vibrating trough (10).

3. The heavy-duty swirling trough device (1) of claim 1, wherein the vibrating trough (10) passes substantially perpendicularly through the trough support (31), so that the longitudinal direction (a) of the vibrating trough (10) and the main extension plane of the relevant trough support (31) enclose a smallest angle in the range from 75° to 90°.

4. The heavy-duty swirling trough device (1) of claim 3, wherein the main extension plane of the trough support (31) is a vertical plane (yz).

5. The heavy-duty swirling trough device (1) of claim 3, wherein the trough support (31) has a one-piece support plate (34) with a constant wall thickness, in which a passage opening (33) for the vibrating trough (10) is formed.

6. The heavy-duty swirling trough device (1) of claim 1, wherein the trough base (11) of the vibrating trough (10) is inclined in the longitudinal direction (a) from a feed end (14) to an outlet end (15), that is inclined at an angle ($\alpha$) in the range from 2° to 15° with respect to a horizontal plane (xy).

7. The heavy-duty swirling trough device (1) of claim 1, wherein the trough cross section between a feed end (14) and an outlet end (15) of the vibrating trough (10) is free of barriers.

8. The heavy-duty swirling trough device (1) of claim 1, wherein adjacent trough supports (31) are connected to one another by at least three longitudinal members (32) in the longitudinal direction (a) of the vibrating trough (10).

9. The heavy-duty swirling trough device (1) of claim 1, wherein the vibration exciters (20) are arranged above the vibrating trough (10) in a region above or laterally outside next to any of the side walls (12a) in such a way that the force action line (k) of the vibration excitation of the relevant vibration exciter (20) extends at a distance of at most 20%, more preferably at most 10%, of the clear width of the vibrating trough (10) between the side walls (12a, 12b) and the upper edge (12c) of the side wall (12a) on the side of the vibration exciter.

10. The heavy-duty swirling trough device (1) of claim 1, wherein the force action line (k) of the vibration excitation of the relevant vibration exciter (20) intersects the trough base (11) upstream of the center of the trough base (11) in the transverse direction (b, y) of the vibrating trough (10).

11. The heavy-duty swirling trough device (1) of claim 1, wherein the trough base (11) has a straight portion in the plane of the trough cross section (bc) which is inclined away from the vibration exciter (20) to a horizontal (b) in the plane of the trough cross section (bc), that is inclined to the horizontal (b) at an angle (β) from 2° to 15°.

12. The heavy-duty swirling trough device (1) of claim 1, wherein the trough base (11) has at least one bead (11a) in the longitudinal direction.

13. The heavy-duty swirling trough device (1) of claim 1, wherein the side walls (12a, 12b) of the vibrating trough (10) each merge into the trough base (11) via a curved portion (13a, 13b), the radius of curvature ($r_a$) of the curved portion (13a) on the side of the vibration exciter (20) being greater than the radius of curvature ($r_b$) of the curved portion (13b) on the opposite side.

14. The heavy-duty swirling trough device (1) of claim 13, wherein the ratio of the radius of curvature ($r_a$) of the curved portion (13a) on the side of the vibration exciter (20) to the radius of curvature ($r_b$) of the curved portion (13b) on the opposite side is greater than 2, preferably greater than 5.

15. The heavy-duty swirling trough device (1) of claim 13, wherein the ratio of the radius of curvature ($r_a$) of the curved portion (13a) on the side of the vibration exciter (20) to the width of the vibrating trough (10) between the side walls (12a, 12b) is less than 0.3 and greater than 0.1.

16. The heavy-duty swirling trough device (1) of claim 13, wherein the radius of curvature ($r_a$) of the curved portion (13a) on the side of the vibration exciter (20) is at least a quarter of the greatest trough depth (t) of the vibrating trough (10).

17. The heavy-duty swirling trough device (1) of claim 1, wherein the force action line (k) of the vibration excitation of the relevant vibration exciter (20) in a vertical plane including the transverse direction (b, y) encloses an angle (y) in the range of 25° to 50° with the trough base (11).

18. The heavy-duty swirling trough device (1) of claim 1, wherein a nominal filling level is larger than 50% of the cross section (bc) of the trough.

19. A method for crystallizing plastic granules having a tendency to stick together, characterized by loading the vibrating trough (10) of a heavy-duty swirling trough device (1) according to any of the preceding claims with plastic granules which, when fed in, have a temperature above the glass transition temperature thereof in the range of the reaction temperature thereof for crystallization, and exciting the vibrating trough (10) by means of the vibration exciter (20) in such a way that the plastic granules in the vibrating trough (10) are subjected to a helical movement, the residence time of the plastic granules in the vibrating trough being 20 to 60 minutes and the vibrating trough (10) being filled with plastic granules over at least 50% of its cross section.

* * * * *